United States Patent

Book

Patent Number: 5,377,794
Date of Patent: Jan. 3, 1995

[54] FOLDABLE COVER WITH EASEL OPTION

[76] Inventor: Steven C. Book, 10220 Scenario La., Los Angeles, Calif. 90077

[21] Appl. No.: 156,089

[22] Filed: Nov. 22, 1993

[51] Int. Cl.$^6$ ............................................. A45C 9/00
[52] U.S. Cl. ...................................... 190/1; 190/107; 383/4
[58] Field of Search ................. 190/1, 107, 90; 383/4; 206/45.24

[56] References Cited

U.S. PATENT DOCUMENTS

| | | |
|---|---|---|
| Re. 30,695 | 8/1981 | Transport . |
| 1,675,060 | 6/1928 | Simmons . |
| 3,107,448 | 10/1963 | Whitney . |
| 3,136,082 | 6/1964 | Sloves . |
| 3,769,741 | 11/1973 | Hessler et al. ............... 206/523 X |
| 3,777,862 | 12/1973 | Zipper ............................ 190/107 |
| 3,994,372 | 11/1976 | Geller et al. ................... 190/107 |
| 4,213,520 | 7/1980 | Sarna et al. . |
| 4,273,221 | 6/1981 | Poag ............................... 190/1 X |
| 4,318,471 | 3/1982 | Hutton . |
| 4,515,493 | 5/1985 | Radovich . |
| 4,544,123 | 10/1985 | Peacock ..................... 206/45.24 X |
| 4,650,111 | 3/1987 | Jahoda . |
| 4,765,462 | 8/1988 | Rose, Jr. . |
| 4,893,711 | 1/1990 | Gustafson . |
| 4,917,505 | 4/1990 | Bullard et al. . |
| 4,984,906 | 1/1991 | Little ............................. 383/97 X |
| 5,332,093 | 7/1994 | Littlepage ....................... 383/4 X |

Primary Examiner—Allan N. Shoap
Assistant Examiner—Christopher J. McDonald
Attorney, Agent, or Firm—Klein & Szekeres

[57] ABSTRACT

A protective cover is foldable into a first configuration as a carrying case, and into a second configuration as an easel. Unfolded, the cover assumes a "T" shape, with first and second surfaces respectively defining the outer and inner surfaces of the carrying case. The cover has a longitudinal portion comprising first and second end sections and a central section, and a "cross-bar" portion comprising the first end section and a pair of flap portions extending laterally therefrom. Hook-and-loop fasteners are disposed on the cover so as to allow the first surface of the second end section to be folded onto and removably fastened to the second surface of the first end section, and the flap portions to be folded onto and removably fastened to the first surface of the central section, thereby forming the carrying case. Conversion to an easel is accomplished by unfastening the fasteners and unfolding the cover to expose the second surface of the first end section, then folding the flap portions toward each other and removably fastening them onto the second surface of the first end section. The longitudinal portion is then folded into a three-sided easel configuration, with the lateral edge defining the second end section being removably secured to the lateral edge defining the first end section to stabilize the easel.

18 Claims, 4 Drawing Sheets fig.6.

FOLDABLE COVER WITH EASEL OPTION

BACKGROUND OF THE INVENTION

This invention relates broadly to the field of carrying cases and protective covers for portable data processing devices, communications devices, or the like. More specifically, it relates to a soft, foldable, fabric cover for such devices, wherein the cover, when removed from the device, can be folded to form a holder or easel for one or more sheets of paper that the user of the device may wish to have available for convenient reference while using the device.

Along with the recent growth in the use of portable personal computers, particularly the so-called "laptop", "notebook", and "sub-notebook" computers, there has been a corresponding growth in the demand for carrying cases and the like for protecting these computers while they are being transported or carried. For example, the typical carrying case may be more or less in the form of a conventional briefcase, with rigid sides, or it may be in the form of a soft-sided zippered bag, similar to a typical travel bag for clothes and personal accessories and the like. In either form, the carrying case differs from a conventional briefcase or carrying bag chiefly by being dimensioned to hold a personal computer that is within a relatively narrow range of physical dimensions, sometimes even being limited to holding a specific make and model of computer.

From the foregoing, it can be seen that one drawback with computer carrying cases that are currently available is that they are not readily adaptable to carrying different types or amounts of equipment. This may be a disadvantage to a user who may wish to carry, at different times, either different types of computers, or different amounts and types of computer accessories, or even other types of equipment altogether (such as, for example, portable telecopiers, typewriters, printers, etc.) Such a user may have to acquire several different carrying cases to suit such varying needs. Alternatively, the user may be presented with the unpleasant choice between a relatively large case, which can accommodate a wide variety of equipment, but which cannot fit inside a larger suitcase or the like (and thus always must be separately carried, even if only partially full); and a relatively small case, which may fit inside a larger suitcase, but which may lack sufficient capacity on some occasions.

Another problem encountered by people who use portable devices such as those described above is that frequently the device must be used in an area in which it may be difficult to set up and hold papers and documents to which the user must refer while operating the device. This may lead to awkward working positions and resultant discomfort for the user. Accordingly, it would be advantageous to provide a carrying case that also includes means for supporting and holding papers and documents for easy viewing by the user.

A number of approaches toward solving this latter problem are suggested by the prior art. For example, the following U.S. Patents show a variety of carrying cases that include movable panels and the like that can be manipulated, or rearranged to form an easel to hold and support sheets of paper: U.S. Pat. No. 3,107,448—Whitney; U.S. Pat. No. 3,136,082—Sloves; U.S. Pat. No. 4,213,520—Sarna et al.; and U.S. Pat. No. 4,893,711—Gustafson. The prior art devices exemplified by the aforementioned patents, however, typically suffer from one or more of the following disadvantages: They provide a case of more or less fixed dimensions that cannot easily be adjusted as to size; they are of a rigid or semi-rigid construction, so as not to be fully collapsible for convenient storage; they are relatively complex (and therefore expensive) to manufacture; and/or they are relatively inconvenient to use.

There has been, therefore, a long-felt, but as yet unsatisfied, need for a protective carrying case that can be manipulated or rearranged to form an easel, and that is also size-adjustable, fully collapsible, inexpensive to manufacture, and easy to use.

SUMMARY OF THE INVENTION

Broadly, the present invention is a foldable, protective cover that can be folded in a first configuration to form a collapsible carrying case for containing an article to be transported therein, and in a second configuration, when empty, to form an easel for supporting sheets of paper or the like.

More specifically, the present invention is a foldable, protective cover, comprising a double layer of flexible yet durable foldable material (preferably a fabric material such as nylon), cut in the shape of a "T" with a flexible, semi-rigid, resilient filling material, such as closed-cell polyethylene foam, contained between the fabric layers. The "T"-shaped cover has first and second surfaces that, when the cover is folded to form a carrying case, respectively define the outer and inner surfaces of the case. Several sets of hook-and-loop fasteners are disposed on the first and second surfaces in such a way as to allow portions of the cover, when the cover is folded in the first configuration, to be removably attached to one another to form a carrying case that may be adjustably conformed to the dimensions of the article to be carried therein. When the article is removed, the mutually attachable portions of the cover are detached from one another, allowing the cover to be folded into its second configuration, in which it forms an easel.

In a preferred embodiment, the "T"-shaped cover has a longitudinal portion having first and second end sections and a central section between them. A pair of opposed flap portions extend laterally from the first end section. On the inner surface, the first end section of the longitudinal portion has a laterally-oriented strip of loop fasteners, of the type used in hook-and-loop fastening devices. The free end of each flap portion is provided with a longitudinally-oriented strip of hook fasteners. On the outer surface, the second end section of the longitudinal portion has a laterally-oriented strip of hook fasteners, while the central section has a pair of opposed, longitudinally-oriented strips of loop fasteners.

To enclose an apparatus or device in the cover (that is, to use the cover as a carrying case), the cover is placed, unfolded, on a supporting surface, with its inner surface facing up. The device is placed on the central section, and the second end section is folded over on top of the device, exposing the lateral strip of hook fasteners on the outer surface. The first end section is then folded over on top of the outer surface of the second end section to bring the lateral strip of loop fasteners on the inner surface of the first end section into adhering contact with the lateral hook fastener strip on the outer surface of the second end section. The cover is then flipped over to expose the two opposed longitudinal loop fastener strips on the outer surface of the central section. Finally, the flap portions are folded toward each other over the outer surface of the central section to bring each of their longitudinal hook fastener strips into adhering contact with a corresponding one of the longitudinal loop fastener strips on the outer surface of the central section, thereby forming a carrying case that substantially encloses the device.

Size adjustment is achieved by having longitudinal loop fastener strips on the outer surface of the central section that are wider than the corresponding longitudinal hook fastener strips on the inner surface of the flap portions, and by providing the lateral hook fastener strip on the outer surface of the second end section and the mating lateral loop fastener strip on the inner surface of the first end section with substantial width. This allows the flap portions to be fastened closer or farther away from each other on the central section to accommodate devices of varying lengths, widths, and thicknesses, while allowing the mutual fastening of the first and second end sections to be adjusted to accommodate devices of varying widths.

Removal of the device can be accomplished simply by unfastening one of the flap portions and sliding the device out, for reinsertion after use, if desired.

To convert the cover to its easel configuration, the device is first removed, and the other flap portion is unfastened. The lateral loop fastener strip on the first end section inner surface is then unfastened from the lateral hook fastener strip on the outer surface of the second end section, and the cover is unfolded to its original position. The flap portions are then folded toward each other over the inner surface of the first end section to bring a portion of each of their longitudinal hook strips into adhering contact with the lateral loop strip on the inner surface of the first end section. This forms the cover into a longitudinal configuration, with a doubled-over first lateral edge substantially coextensive with the lateral edge of the first end section, and a second lateral edge corresponding to the lateral edge of the second end section.

The outer surface of each flap portion is provided with at least one tab that is located so as to be adjacent to the first lateral edge. The longitudinal portion of the cover is then folded into its easel configuration, in which the first end section forms the base of the easel, the central section forms the back, and the second end section forms the front. The second lateral edge is tucked under the tabs on the first lateral edge to removably secure the front of the easel to the base, and thus stabilize the easel configuration, with the outer surface of the second end section presenting an angled easel surface on which one or more sheets of paper can be held. Advantageously, the outer surface of the second end section is provided with a plurality of paper retention tabs along the second lateral edge, so that the sheets of paper can be held near the juncture between the base and the front of the easel to prevent the paper from sliding down off of the easel.

The cover is advantageously provided with a plurality of pockets on both the inner and outer surfaces, and a handle is also advantageously disposed laterally on the outer surface of the central section, near its juncture with the first end section. Also, a ring may be attached to the outer surface of each flap portion for the removable attachment, by snap hooks, of a shoulder strap.

From the foregoing, it can be seen that the present invention offers a size-adjustable, fully collapsible cover, that quickly and easily converts into an easel, and that lends itself to economical manufacture. These and other advantages will be more fully appreciated from the detailed description that follows.

DETAILED DESCRIPTION OF THE PREFERRED EMBODIMENT

Figure 1:
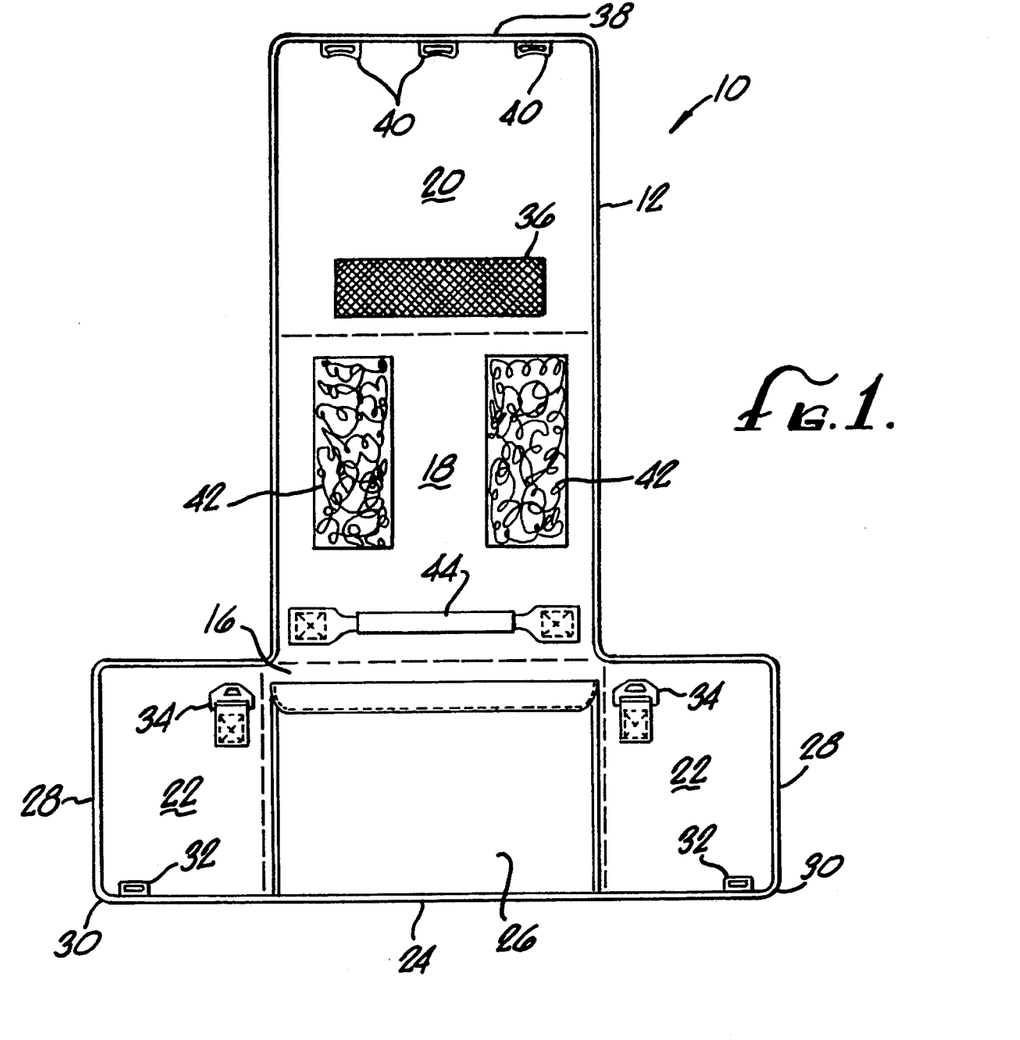
FIG. 1 is a plan view of the outer surface of a cover in accordance with the preferred embodiment of the present invention, showing the cover in its fully unfolded configuration.
Figure 2:
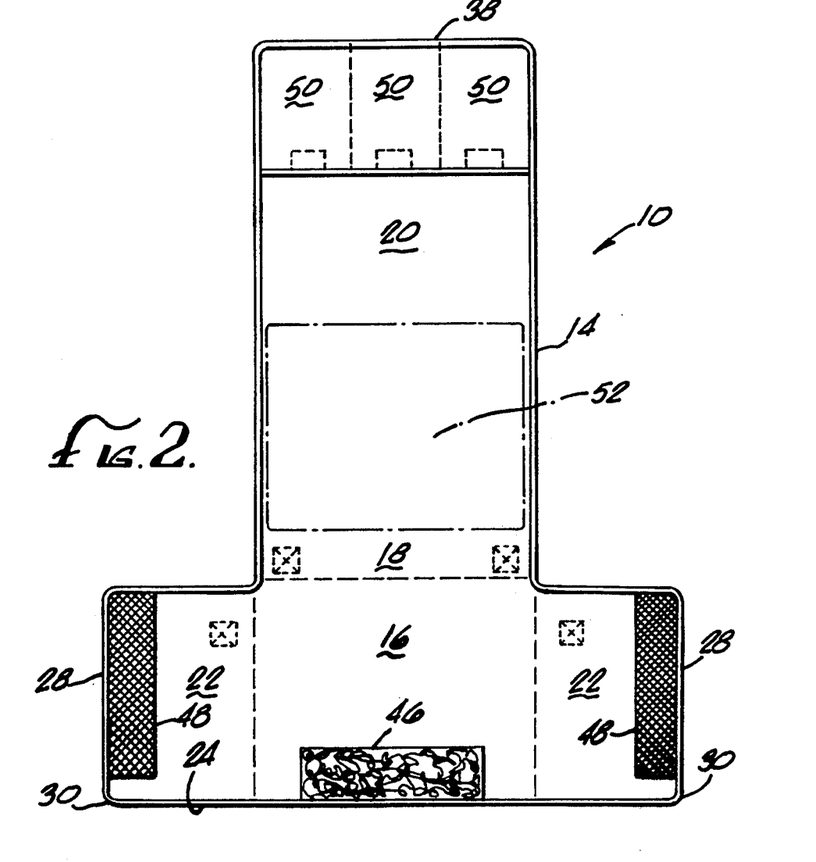
FIG. 2 is a plan view of the inner surface of the cover of FIG. 1, showing the cover in its fully unfolded configuration, and with an article to be enclosed and carried within the cover also shown, in phantom.

Referring first to FIGS. 1 and 2, a foldable, collapsible cover 10 is shown in its unfolded state. The cover is made of a flexible, durable, foldable material, preferably water-resistant. Nylon fabric is considered the best material that is currently widely available, but other materials, such as leather and PVC plastic sheet material, may be found to be suitable. The cover 10 is made of a double layer of such material, stitched or otherwise adhered together at the edges, and filled with a suitable filling (not shown) between the layers. A flexible, semi-rigid, resilient filling material is used, with closed-cell polyethylene foam being preferred.

As shown in FIGS. 1 and 2, the cover is formed in a "T" shape, with a first surface 12 (FIG. 1) and a second surface 14 (FIG. 2). When the cover is configured as a carrying case (as will be described below), the first and second surfaces respectively define the outer and inner surfaces of the carrying case. The "T"-shaped cover 10 has a longitudinal portion having a first end section 16 in the middle of the cross-bar of the "T" shape, a central section 18, and a second end section 20. A pair of opposed flap portions 22 extend laterally from the first end section 16, forming, with the first end section 16, the cross-bar of the "T" shape.

Referring now specifically to FIG. 1, the first or outer surface 12 of the cover 10 is described. The first end section 16 is defined by a first lateral edge 24 that extends across the entire cross-bar of the "T". An optional outer pocket 26 may be attached to the outer surface of the first end section 16.

Each of the flap portions 22 has a free end defined by a longitudinal edge 28 that meets the first lateral edge 24 at an outer corner 30. Near each of the outer corners 30, adjacent the first lateral edge 24, is attached a stabilizing tab 32. As will be described below, the stabilizing tabs 32 function as stabilizing means for the easel configuration of the cover 10. A ring or hoop 34 is optionally attached to each of the flap portions 22 near the corner diagonally opposite the outer corner 30. The purpose of the rings or hoops 34 will be described below.

Disposed laterally across the second end section 20 near its juncture with the central section is a lateral strip of fibrous hook fasteners 36, of the type that is used with complementary fibrous loop fasteners to form what is known as a "hook-and-loop" fastener, such as is marketed under the trademark "VELCRO". The lateral hook strip 36, like the other strips of fasteners that will be described below, is advantageously in the form of a tape that is attached to the cover. In the preferred embodiment, in which the cover is made of a nylon fabric, the strips are sewn onto the cover. If the cover is made of PVC plastic sheeting or a similar material, an adhesive may be used for attaching the strips. The second end section 20 has a free end defined by a second lateral edge 38, across which are attached sheet holding means, such as a plurality of sheet retention tabs 40.

The central section 18 is provided with a pair of opposed, parallel, longitudinally-oriented strips of loop fasteners 42. For reasons that will be explained below, these longitudinal loop strips 42 advantageously have a substantial width (laterally measured), each preferably being more than a quarter of the total width of the central section 18. The central section also is provided with a laterally-oriented handle 44, preferably attached near the juncture of the central section 18 with the first end section 16.

FIG. 2 shows the second or inner surface 14 of the cover 10. Extending across the inner surface of the first end section 16, adjacent the first lateral edge 24, is a lateral strip of loop fasteners 46. A longitudinal strip of hook fasteners 48 is fixed to the inner surface of each of the flap portions 22, near their free ends, adjacent the longitudinal edges 28, but spaced from the first lateral edge 24, so as to leave the area around each of the outer corners 30 without fastening means. Advantageously attached to the inner surface of the second end section 20 are a plurality of inner pockets 50, with their closed ends sealed by the seam along the second lateral edge 38. If the cover 10 is to be used as a carrying case for a typical "notebook" computer having a 3.5 inch (8.9 cm) floppy disk drive, the inner pockets 50 are advantageously dimensioned to carry 3.5 inch (8.9 cm) floppy disks, although they may be of different dimensions to carry a variety of other articles.

Figure 3:
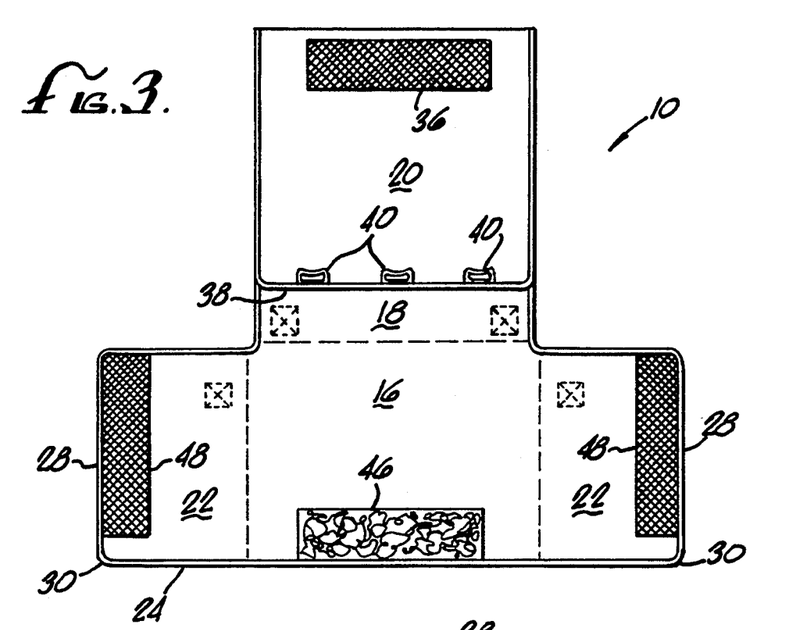
FIG. 3 is a plan view, similar to that of FIG. 2, showing the step of folding the second end section of the cover over the article.
Figures 4, 5, 9:
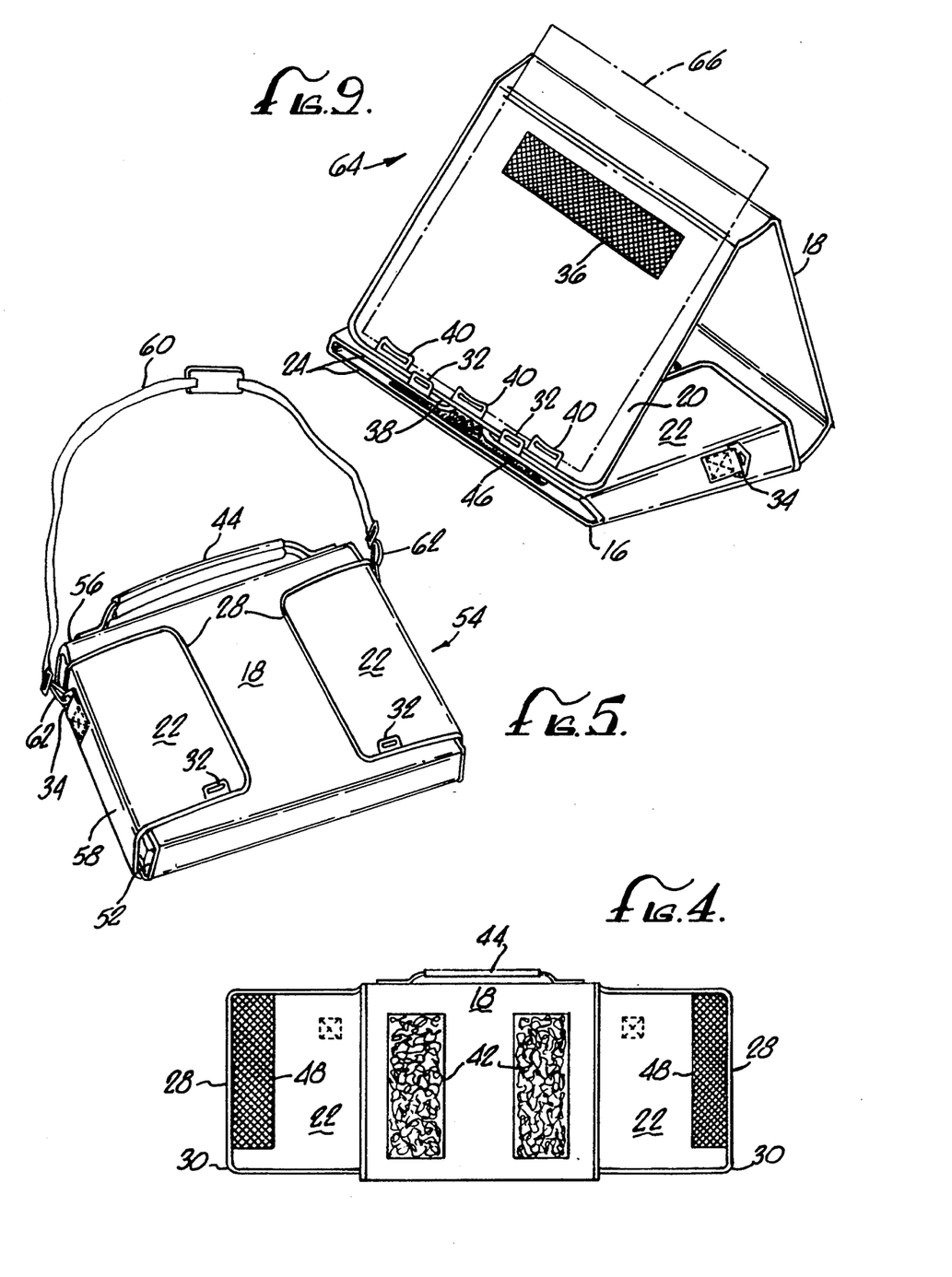
FIG. 4 is a plan view of the cover, showing the cover as a carrying case for the article, but before the final closure of the cover by the folding of the flap portions inwardly over the outer surface of the central section.
FIG. 5 is a perspective view of the cover in its carrying case configuration.
FIG. 9 is a front perspective view of the cover in its easel configuration, showing a sheet of paper (in phantom) being held thereon.

The method of folding the cover 10 into its carrying case configuration to enclose and carry an article or device is illustrated in FIGS. 2 through 5. First, as shown in FIG. 2, the cover is placed, unfolded, on a surface, with its inner surface 14 facing up. An article or device 52, such as a "notebook" computer, is seated on the inner surface of the central section. Then, as shown in FIG. 3, the second end section 20 is folded over on top of the device 52, exposing the lateral hook fastener strip 36 on the outer surface of the second end section 20. The inner surface of the first end section 16 is then removably fastened to the outer surface of the second end section 20 by folding the first end section 16 over on top of the outer surface of the second end section 20 to bring the lateral loop fastener strip 46 on the inner surface of the first end section 20 into a removable adhering contact with the lateral hook fastener strip 36 on the outer surface of the second end section 20. The cover 10, with the first and second end sections and the central section now folded around the device 52, is now flipped over, thereby exposing the two opposed longitudinal loop fastener strips 42 on the outer surface of the central section, as shown in FIG. 4. Finally, the inner surfaces of the two flap portions 22 are removably fastened to the outer surface of the central section 18 by folding the flap portions 22 toward each other over the outer surface of the central section 18 to bring the longitudinal hook fastener strips 48 on the inner surface of the flap portions 22 into a removable adhering contact with the longitudinal loop fastener strips 42.

The last step described above results in the formation of a carrying case 54, as shown in FIG. 5, substantially enclosing the device 52. When folded into the carrying case configuration, by means of the above-described steps, the area of the central section 18 adjacent the first end section 16, to which the handle 44 is attached, becomes an upper end surface 56 of the case 54, whereby the handle 44 is properly positioned and oriented for carrying the case. In addition, the areas of the flap portions 22 adjacent the first end section 16, to which the rings or hoops 34 are attached, become opposed side surfaces 58 of the case 54, whereby the rings or hoops 34 are properly positioned and oriented for the removable attachment of an optional shoulder strap 60 by means of snap hooks 62 or the like.

Size adjustment is achieved by having longitudinal loop fastener strips 42 on the outer surface of the central section 18 that are wider than the corresponding longitudinal hook fastener strips 48 on the inner surface of the flap portions 22, and by providing the lateral hook fastener strip 36 on the outer surface of the second end section 20 and the mating lateral loop fastener strip 46 on the inner surface of the first end section 16 with substantial width. This allows the flap portions 22 to be fastened closer or farther away from each other on the central section 18 to accommodate devices of varying lengths, widths, and thicknesses, while allowing the mutual fastening of the first end section 16 and the second end section 20 to be adjusted to accommodate devices of varying widths. In a specific example of the preferred embodiment of the invention, all fastener strips are about 2 inches (5 cm) wide, except for the longitudinal loop fastener strips, which are about 3 inches (7.5 cm) wide.

Removal of the device can be accomplished simply by unfastening one of the flap portions 22 and sliding the device out the now open side of the case 54, for reinsertion after use, if desired.

Figure 6:
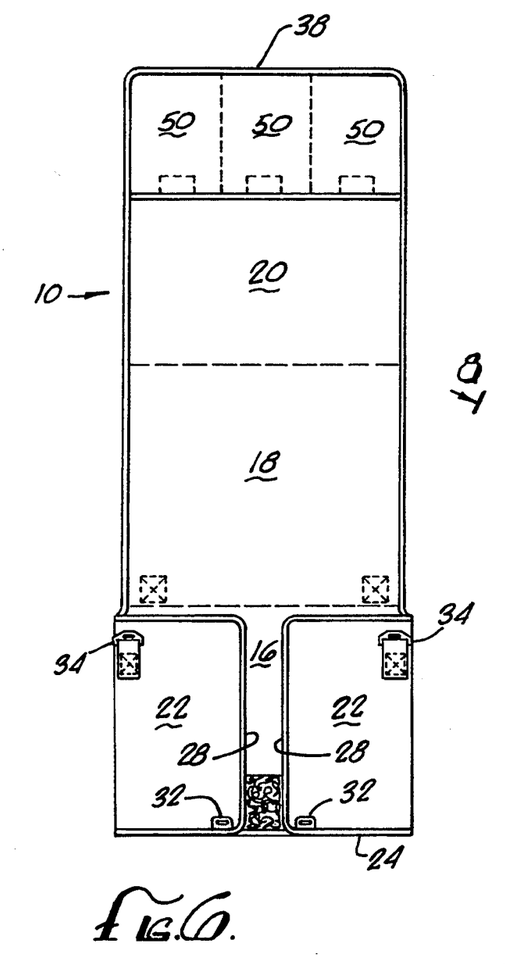
FIG. 6 is a plan view of the cover, showing its surface, after the first step in the easel conversion process has been performed by folding the flap portions inwardly over the inner surface of the first end section.

Conversion of the cover 10 to its easel configuration is illustrated in FIGS. 6 through 9. After removal of the device 10 (for example, by unfastening one of the flap portions 22 and sliding the device out, as described above), the other flap portion is unfastened. The lateral loop fastener strip 46 on the inner surface of the first end section 16 is then unfastened from the lateral hook fastener strip 36 on the outer surface of the second end section 20, and the longitudinal portion of the cover is unfolded to expose the inner surface of the first end section 16, the inner surface 14 thus facing up. The inner surfaces of the flap portions 22 are then removably fastened to the inner surface of the first end section 16 by folding the flap portions 22 toward each other, over the inner surface of the first end section 16, to bring a portion of each of their longitudinal hook fastener strips 48 into a removable adhering contact with the lateral loop fastener strip 46 on the inner surface of the first end section 16. This forms the cover 10 into a longitudinal configuration, as shown in FIG. 6, with the stabilizing tabs 32 being outwardly exposed and aligned along the first lateral edge 24, the latter having been doubled over by the inwardly-directed folding of the flap portions 22.

Figure 7:
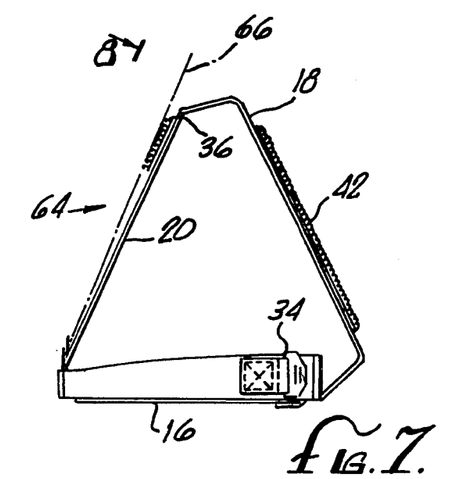
FIG. 7 is a side elevational view of the cover in its easel configuration.
Figure 8:
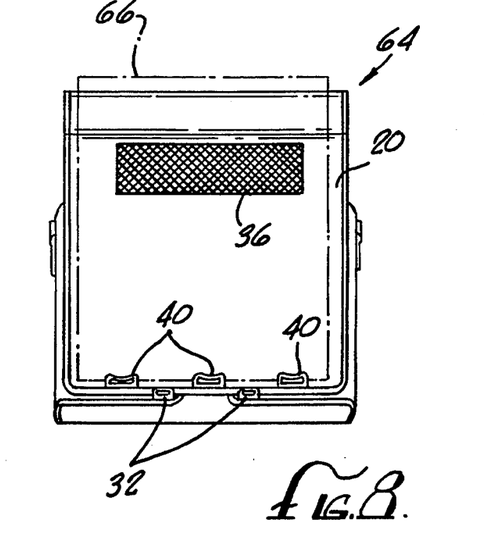
FIG. 8 is a front elevational view, taken along line 8—8 of FIG. 7.

The longitudinal portion of the cover is then folded into the configuration of a three-sided easel 64, shown in FIGS. 7, 8, and 9, in which the first end section 16 forms the base of the easel 64, the central section 18 forms the back, and the second end section 20 forms the front. The second lateral edge 38 is tucked between the stabilizing tabs 32 and the outer surface of the flap portions 22, thereby removably securing the front of the easel 64 to the base, and thus stabilizing the easel configuration, with the outer surface of the second end section 20 presenting an angled easel surface on which one or more sheets of paper 66 can be held. The partial rigidity of the foam filling material between the layers of fabric forming the cover 10 allows the cover 10 to maintain the three-sided easel configuration without collapsing of its own weight.

When the cover 10 is folded into its above-described easel configuration, with the second lateral edge 38 removably secured by the stabilizing tabs 32, the sheet retention tabs 40 are aligned along the juncture between the first lateral edge 24 and the second lateral edge 38; that is, at the bottom of the easel front defined by the outside surface of the second end section 20. The sheets of paper 66 can thus be removably held by the sheet retention tabs 40 near the bottom of the front of the easel to prevent the paper sheets 66 from sliding down off of the easel.

As will be appreciated from the foregoing description, the present invention offers significant advantages over prior art cases and the like that convert to easels. For example, as previously mentioned, the case provided by the present invention is easily adjustable to accommodate differently-sized articles to be contained within it, and it is completely collapsible for convenient storage. In addition, conversion between the carrying case and easel configurations is quick and simple. Furthermore, a cover in accordance with the present invention can be easily and inexpensively manufactured. Still another advantage is that when the present invention is used as a carrying case for a relatively delicate piece of equipment, such as a "notebook" computer, the major surfaces of the equipment are protected by a double thickness of the cover. Specifically, one major surface is protected by the first end section folded on top of the second end section, and the opposite major surface is protected by the flap portions folded on top of the central section. Still another advantage is that, because the invention is size-adjustable, and even completely collapsible, it can easily be carried inside a larger carrying case or bag particularly when the carrying case 54 of the present invention is empty or filled to less than its full capacity.

Although a specific preferred embodiment has been described above in accordance with the best mode of the invention currently known, a number of modifications and variations may suggest themselves to those skilled in the pertinent arts. For example, while hook-and-loop fasteners are believed to offer significant advantages over other types of releasable fasteners, such alternatives as snap fasteners and zippers may be used in place of some or all of the hook-and-loop fasteners, perhaps with some alteration of the structure of the cover. Even if hook-and-loop fasteners are used, it is arbitrary which of the complementary lateral fastener strips is the hook fastener strip and which is the loop fastener strip. Likewise, it is arbitrary which of the complementary longitudinal fastener strips is the hook fastener strip and which is the loop fastener strip, although for aesthetic purposes, it is considered preferable to have the longitudinal flap portion strips 48 be the hooks and the longitudinal central section strips 42 be the loops, as described above. (Of course, the longitudinal flap portion strips 48 and the lateral strip 46 on the first end section must be complementary.) Furthermore, the specific configuration, arrangement, and number of pockets described above is exemplary only, with a large number of variations in these parameters being possible. In addition a number of mechanisms may be found that equivalently perform the stabilizing function of the stabilizing tabs 32, and the paper holding function of the paper retention tabs 40. These and other variations and modifications that may suggest themselves should be considered within the spirit and scope of the present invention, as defined in the claims that follow.

What is claimed is:

1. A device that is convertible between a carrying case configuration and an easel configuration, comprising:
  a foldable cover having a generally "T"-shaped configuration, with a first surface and a second surface, the cover having (a) a longitudinal portion comprising a first end section defined by a first lateral edge, a second end section defined by a second lateral edge, and a central section between the first and second end sections, and (b) a lateral cross-bar portion comprising the first end section and a flap portion on either side of the first end section;
  first fastening means on the first surface of the second end section;
  second fastening means located on the second surface of the first end section so as to be removably fastenable to the first fastening means when the cover is folded so as to bring the first surface of the second end section into contact with the second surface of the first end section;
  third fastening means on the first surface of the central section; and
  fourth fastening means located on the second surface of each of the flap portions so as to be (a) removably fastenable to the third fastening means when the first and second fastening means are fastened to each other and the flap portions are folded toward each other so as to bring the second surface of the flap portions into contact with the first surface of the central section, and (b) removably fastenable to the second fastening means when the flap portions are folded toward each other so as to bring the second surface of the flap portions into contact with the second surface of the first end portion;
  whereby the cover forms the carrying case configuration when the first and second fastening means are fastened together and the third and fourth fastening means are fastened to each other; and
  whereby the cover forms the easel configuration when the second and fourth fastening means are fastened to each other, and when the longitudinal portion of the cover is folded so as to form a three-sided configuration with the first and second lateral edges in mutual contact.

2. The device of claim 1, wherein the first and second fastening means include complementary hook-and-loop fastener means, wherein the third and fourth fastening means include complementary hook-and-loop fastener means, and wherein the second and fourth fastening means include complementary hook-and-loop fastener means.

3. The device of claim 2, wherein the first fastening means includes a lateral strip of fibrous hook fastening means, the second fastening means includes a lateral strip of fibrous loop fastener means, the third fastening means includes a longitudinal strip of fibrous loop fastener means, and the fourth fastening means includes a strip of fibrous hook fastener means on each of the flap portions.

4. The device of claim 3, wherein the third fastening means includes a parallel pair of longitudinal strips of fibrous loop fastener means.

5. The device of claim 4, wherein each of the longitudinal strips of fibrous loop fastener means is substantially wider, measured laterally, than each of the longitudinal strips of fibrous hook fastener means.

6. The device of claims 1, 2, 3, 4, or 5, further comprising:
stabilizing means, located on the first surface of each of the flap portions so as to lie substantially along the first lateral edge when the flap portions are folded toward each other so as to fasten the second and fourth fastening means to each other, for releasably holding the first and second lateral edges together when the cover is folded into the three-sided configuration to form the easel configuration.

7. The device of claim 6, wherein the stabilizing means includes a tab on the first surface of each of the flap portions, each of the tabs being configured to releasably engage the second lateral edge when the first and second lateral edges are brought into mutual contact.

8. The device of claims 1, 2, 3, 4, or 5, further comprising sheet retention means attached to the first surface of the second end section adjacent the second lateral edge.

9. The device of claim 6, further comprising sheet retention means attached to the first surface of the second end section adjacent the second lateral edge.

10. A device that is convertible between a carrying case configuration and an easel configuration, comprising:
a foldable cover having a generally "T"-shaped configuration, with a first surface and a second surface, the cover having (a) a longitudinal portion comprising a first end section defined by a first lateral edge, a second end section defined by a second lateral edge, and a central section between the first and second end sections, and (b) a lateral cross-bar portion comprising the first end section and a flap portion on either side of the first end section;
first hook-and-loop fastening means, on the first surface of the second end section and on the second surface of the first end section, for releasably fastening the first surface of the second end section to the second surface of the first end section when the cover is folded so as to bring the first surface of the second end section into contact with the second surface of the first end section;
second hook-and-loop fastening means, on the first surface of the central section and on the second surface of each of the flap portions, for releasably fastening the second surface of each of the flap portions to the first surface of the central section when the flap portions are folded toward each other so as to bring the second surface of each of the flap portions into contact with the first surface of the central section; and
third hook-and-loop fastening means, on the second surface of the first end section and on the second surface of each of the flap portions, for releasably fastening the second surface of each of the flap portions to the second surface of the first end section when the flap portions are folded toward each other so as to bring the second surface of each of the flap portions into contact with the second surface of the first end section;
whereby the cover forms the carrying case configuration when the first surface of the second end section is fastened to the second surface of the first end section and the second surface of each of the flap portions is fastened to the first surface of the central section; and
whereby the cover forms the easel configuration when the second surface of each of the flap portions is fastened to the second surface of the first end section and the longitudinal portion of the cover is folded so as to form a three-sided configuration with the first and second lateral edges in mutual contact.

11. The device of claim 10, wherein the first hook-and-loop fastening means comprises a first pair of complementary fibrous hook-and-loop fastener strips, a first one of the first pair disposed laterally on the first surface of the second end section, and a second one of the first pair disposed laterally on the second surface of the first end section.

12. The device of claim 11, wherein the second hook-and-loop fastening means comprises second and third pairs of complementary fibrous hook-and-loop fastener strips, a first one of each of the second and third pairs disposed longitudinally on the first surface of the central section, a second one of the second pair being disposed longitudinally on the second surface of one of the flap portions, and a second one of the third pair being disposed longitudinally on the second surface of the other of the flap portions.

13. The device of claim 12, wherein the third hook-and-loop fastening means comprises:
the second one of the first pair of complementary hook-and-loop fastener strips that is disposed laterally on the second surface of the first end section; and
the second ones of the second and third pairs of complementary hook-and-loop fastener strips that are disposed longitudinally on the second surface of the flap portions;
whereby the second one of the first pair is complementary to the second ones of both the second and third pairs, so that the second ones of the second and third pairs are releasably fastenable to the second one of the first pair.

14. The device of claim 13, wherein each of the first ones of the second and third pairs of strips is substantially wider, measured laterally, than each of the second ones of the second and third pairs of strips.

15. The device of claims 10, 11, 12, 13, or 14, further comprising:

stabilizing means, located on the first surface of each of the flap portions so as to lie substantially along the first lateral edge when the flap portions are folded toward each other so as to fasten the second and fourth fastening means to each other, for releasably holding the first and second lateral edges together when the cover is folded into the three-sided configuration to form the easel configuration.

16. The device of claim 15, wherein the stabilizing means includes a tab on the first surface of each of the flap portions, each of the tabs being configured to releasably engage the second lateral edge when the first and second lateral edges are brought into mutual contact.

17. The device of claims 10, 11, 12, 13, or 14, further comprising sheet retention means attached to the first surface of the second end section adjacent the second lateral edge.

18. The device of claim 15, further comprising sheet retention means attached to the first surface of the second end section adjacent the second lateral edge.

* * * * *